United States Patent [19]

Carey

[11] 4,184,238
[45] Jan. 22, 1980

[54] METHOD OF MAKING AN EXTENDIBLE/EXPANDABLE NOZZLE FOR ROCKET ENGINES

[75] Inventor: Lee F. Carey, North Tonawanda, N.Y.

[73] Assignee: Textron Inc., Providence, R.I.

[21] Appl. No.: 809,549

[22] Filed: Jun. 24, 1977

Related U.S. Application Data

[62] Division of Ser. No. 637,405, Dec. 3, 1975, abandoned.

[51] Int. Cl.² .................. B23P 15/00; B21D 53/92; B64C 15/06
[52] U.S. Cl. .................. 29/157 C; 239/265.43; 113/116 DD; 72/379
[58] Field of Search ...... 29/157 C, DIG. 3, DIG. 37; 72/167, 168, 368, 379; 239/265.19, 265.33, 265.43; 60/271; 113/116 V, 116 DD

[56] References Cited

U.S. PATENT DOCUMENTS

| | | | |
|---|---|---|---|
| 1,748,772 | 2/1930 | Hunker | 72/368 |
| 1,771,955 | 7/1930 | Fork et al. | 72/168 |
| 2,152,522 | 3/1939 | McCann | 29/159 R |
| 2,593,420 | 4/1952 | Diehl | 239/265.43 |
| 3,084,505 | 4/1963 | Cherchi | 239/265.11 |
| 3,153,319 | 10/1964 | Young et al. | 239/265.19 |
| 3,249,306 | 5/1966 | Altseimer | 239/265.43 |
| 3,346,186 | 10/1967 | Fulton et al. | 239/265.43 |
| 3,391,869 | 7/1968 | Glass | 239/265.19 |
| 3,519,070 | 7/1970 | Bappler | 29/157.3 AH |
| 3,559,741 | 2/1971 | Levy | 239/265.43 |
| 3,596,465 | 8/1971 | Paine et al. | 239/265.19 |
| 3,615,052 | 10/1971 | Tumavicus | 239/265.43 |
| 3,665,588 | 5/1972 | Mizuguchi et al. | 113/116 D |
| 3,711,027 | 1/1973 | Carey | 239/265.43 |
| 4,044,636 | 8/1977 | Kolodziej | 72/167 |

*Primary Examiner*—C.W. Lanham
*Assistant Examiner*—Daniel C. Crane
*Attorney, Agent, or Firm*—Bean, Kauffman & Bean

[57] ABSTRACT

A skirt-like device attached to the exit end of a rocket engine nozzle is fabricated of thin sheet heat resistant metal; which when extended in operative condition is in frustoconical form, but which prior to engine firing is pleat-folded inwardly into a stowed position relative to the exit end of the rocket engine nozzle. Thus, prior to engine firing the device adds little or nothing to the engine/nozzle occupancy space; but incident to engine firing the device deploys to provide an effective engine nozzle/skirt combination of increased length and exit diameter/area; said combination having an inner surface of constant slope.

6 Claims, 17 Drawing Figures

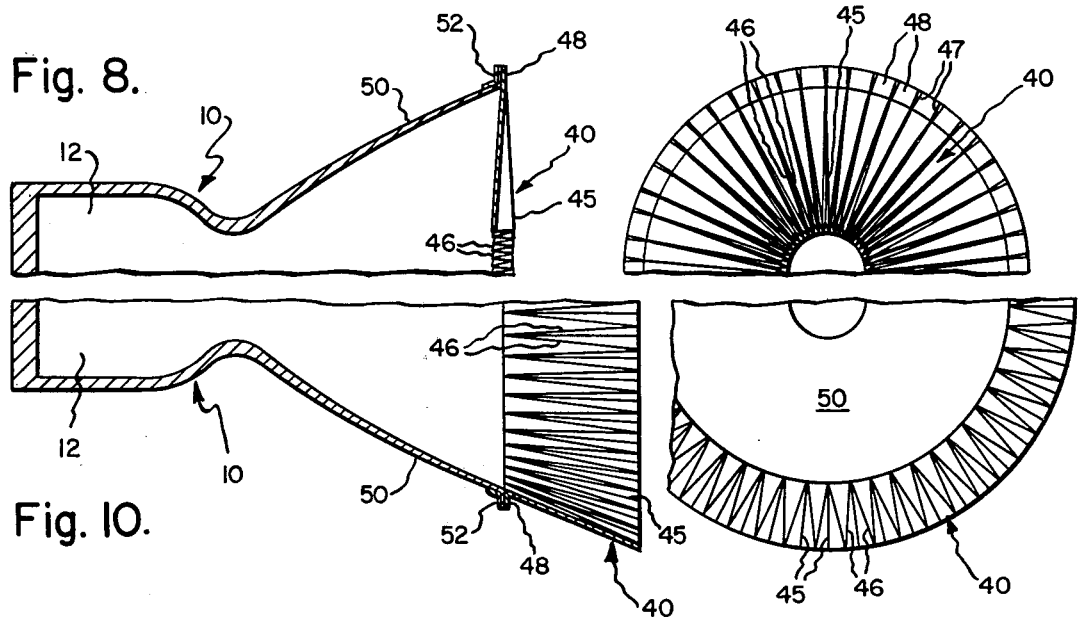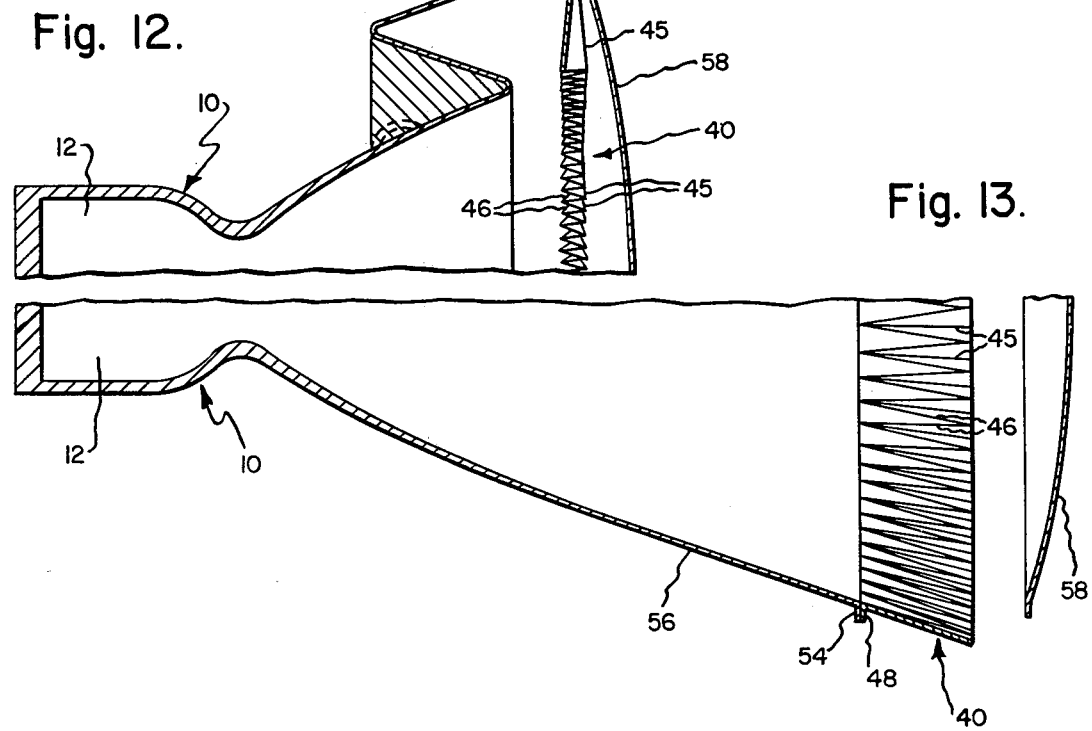

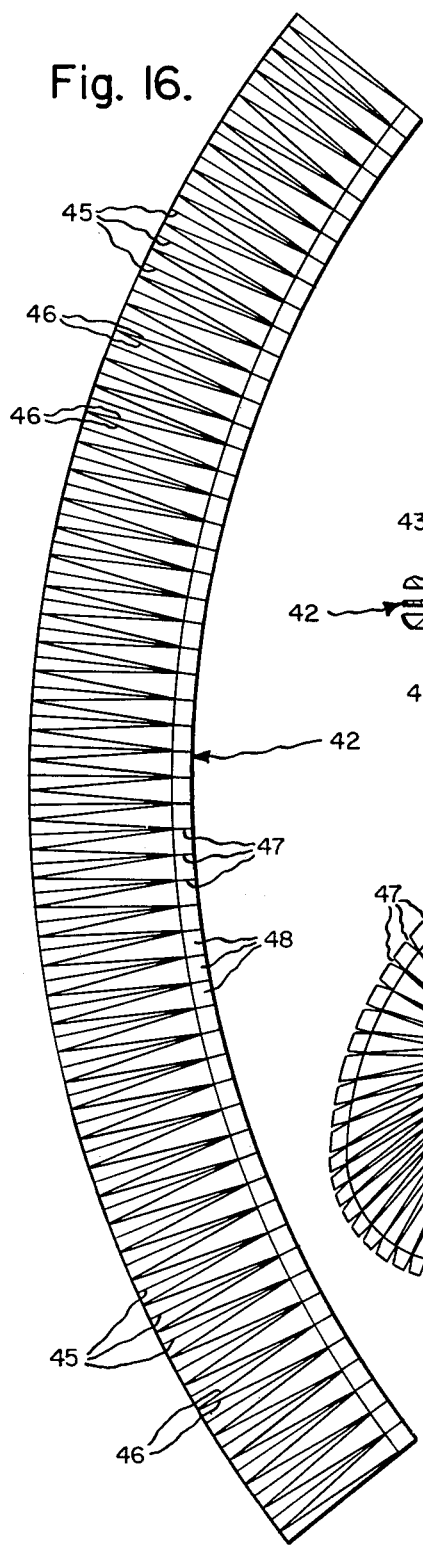
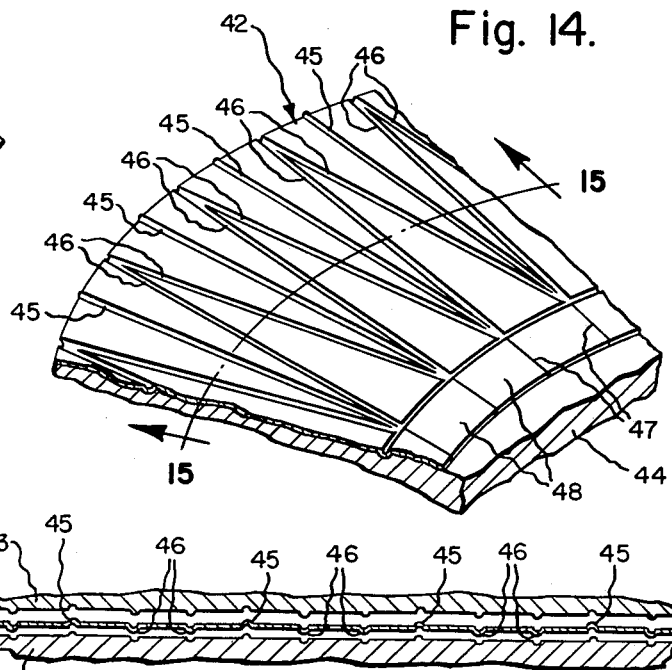
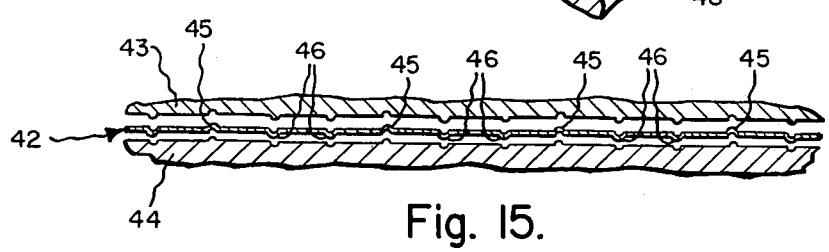
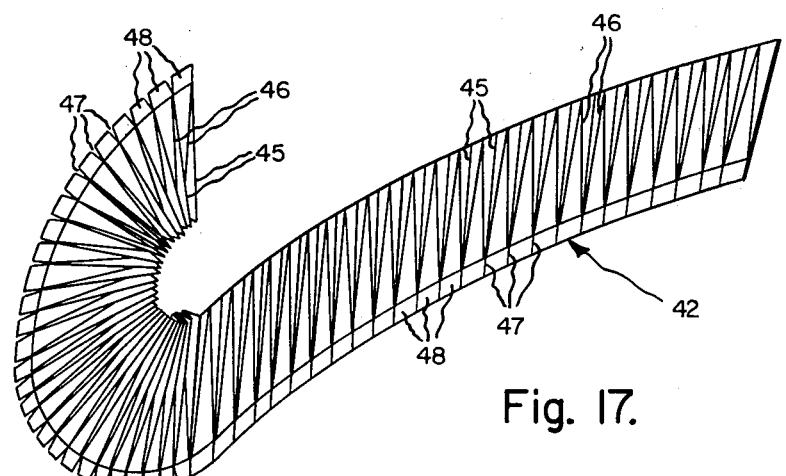

METHOD OF MAKING AN EXTENDIBLE/EXPANDABLE NOZZLE FOR ROCKET ENGINES

CROSS REFERENCES TO RELATED PATENTS

This is a division, of application Ser. No. 637,405, filed Dec. 3, 1975 now abandoned, the benefit of the filing date of which is hereby claimed.

This application discloses subject matter relating to the art discussed in U.S. Pat. Nos. 3,183,664; 3,249,306; 3,270,504; 3,275,193; 3,346,186; 3,358,933; 3,482,783; 3,494,513; 3,526,365; 3,561,679, 3,596,465; 3,711,027; 3,784,109; and British Pat. No. 1,107,635.

BACKGROUND OF THE INVENTION

As is well known, the nozzle expansion of a rocket engine required for maximum thrust efficiency varies with the ambient pressure. In multi-stage rocket engines where a later stage is to be fired in space or at high altitudes, the expansion ratio is of major importance and requires a terminal divergent exit nozzle for the rocket engine of substantial length and exit diameter. However, to make a second or later engine stage of such overall length and diameter as would be required to produce a requisite expansion ratio would be extremely cumbersome and wasteful of otherwise usable space in the rocket assembly. Thus, it is desirable to provide means associated with a rocket engine so that a divergent nozzle of a length and diameter suitable for maximum thrust as low ambient pressure may be obtained by deploying such means substantially coincidental to firing of the engine. In this way, the inoperative rocket engine and its accessories may be compacted so that the entire assembly requires a storage space no larger than the non-extended rocket engine assembly.

BRIEF DESCRIPTION OF THE INVENTION

The invention provides a device of skirt-like form which when extended is in the form of an annulus of frusto-conical configuration attached in mounted ring manner at its smaller diameter end to the exit of a fixed engine nozzle or to the exit of an extendible nozzle. The device is fabricated of thin sheet heat resistant metal and is adapted to be pleat-folded inwardly relative to its mounting ring portion and stowed in a retracted position relative to the engine nozzle; thereby minimizing the space occupied by the engine before firing. When installed upon a fixed nozzle type engine, upon firing of the engine the initially developed gases impinge against the stowed skirt and push it outwardly; whereupon the skirt unfolds and opens up to provide a smoothly continuing extension of the conical form and slope of the engine nozzle, thereby increasing the length and end diameter of the effective nozzle, and in consequence the payload and range of the equipment.

Alternatively, the skirt of the invention may be provided as a supplement to an extendible engine nozzle, and the system so arranged that the gases initially developed upon engine firing (or by auxiliary supply gas pressuring) impinge against the nozzle cover and thereby deploy the extendible nozzle portion of the engine. In such case upon jettisoning of the cover the internal gas pressures will cause the skirt to open up to provide a smoothly continuing extension of the conical slope form of the deployed engine nozzle. Alternatively, the extendible nozzle portion of the engine may be equipped with actuators operable by a firing sequence control system, whereby the extendible nozzle portion will be extended after ignition of the engine. The engine exhaust plume then peripherally engages the inner edge of the stowed skirt and drives it outwardly, causing it to open up to provide a smoothly continuing extension of the conical slope form of the engine nozzle.

Thus, both the length of the effective nozzle and the diameter/area of its exit end are increased; and in consequence the payload/range performance capabilities of the engine are substantially improved.

THE DRAWING HEREWITH

FIG. 1 is a longitudinal sectional view showing one embodiment of the present invention; and illustrates the skirt device thereof as being mounted on the exhaust end portion of an extendible rocket engine nozzle of the type shown for example in U.S. Pat. No. 3,711,027; the skirt device being illustrated in its stowed position within the boundaries of the extendible nozzle structure when in its retracted position;

FIG. 8 is a fragmentary view corresponding to a portion of FIG. 1, but illustrates adaptation of the invention to a different form of engine nozzle; the skirt device of the invention being shown in retracted "stowed" condition;

FIG. 9 is an end elevational view of the showing in FIG. 8;

FIG. 10 is a fragmentary view corresponding to FIG. 8 but illustrates the skirt device in its deployed condition;

FIG. 11 is an end elevational view of the fragmentary showing of FIG. 10;

FIG. 12 is a fragmentary sectional view corresponding somewhat to FIG. 1, but showing an alternative storage arrangement including in combination an extendible/expandable primary nozzle and a skirt of the present invention;

Figure 1:
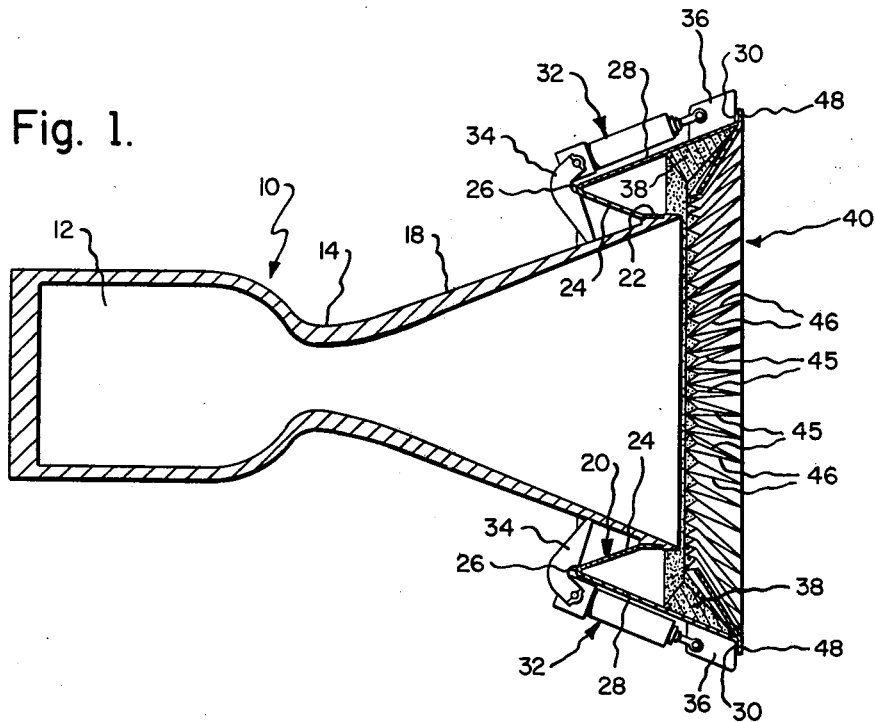

FIG. 13 corresponds to FIG. 10 but illustrates the configuration of the extended/expanded nozzle and skirt combination of FIG. 12 subsequent to firing of the rocket engine;

FIG. 14 is a fragmentary perspective view showing how a thin sheet metal workpiece may be laid upon a die plate and crease-pressed and cut preliminary to further fabrication into a skirt device of the present invention;

FIG. 15 is a fragmentary sectional view taken on line 15—15 of FIG. 14, illustrating the die pressing operation;

FIG. 16 illustrates the die-pressed and cut workpiece product of the operation referred to in FIGS. 14, 15; and FIG. 17 illustrates how the workpiece as illustrated at FIG. 16 is thereupon pleat-folded upon itself progressively from one end thereof to the other preliminary to uniting the opposite ends thereof, whereby to provide the finished skirt device in its form as shown for example at FIG. 9.

DETAILED DESCRIPTION

As shown in FIGS. 1–7 herewith, the invention may be applied to a deployable type engine nozzle such as shown for example in U.S. Pat. Nos. 3,711,027 and 3,784,109. As illustrated herein, the rocket engine is indicated generally at 10 and typically includes a chamber 12 wherein controlled combustion takes place for the generation of high mass rate flow combustion gases. The chamber 12 delivers through a restricted throat portion 14 which exits into a conically divergent fixed nozzle portion 18. The extendible portion of the rocket nozzle extension is indicated generally by the numeral 20, and connects as indicated at 22 in ring mounted manner at its smaller diameter end to the exit end portion of the fixed nozzle 18. The nozzle extension 20 consists of a first section 24 which is joined along a fold line 26 to an outer section 28 which terminates at its outer end in an out-turned flange portion 30.

Figure 2:
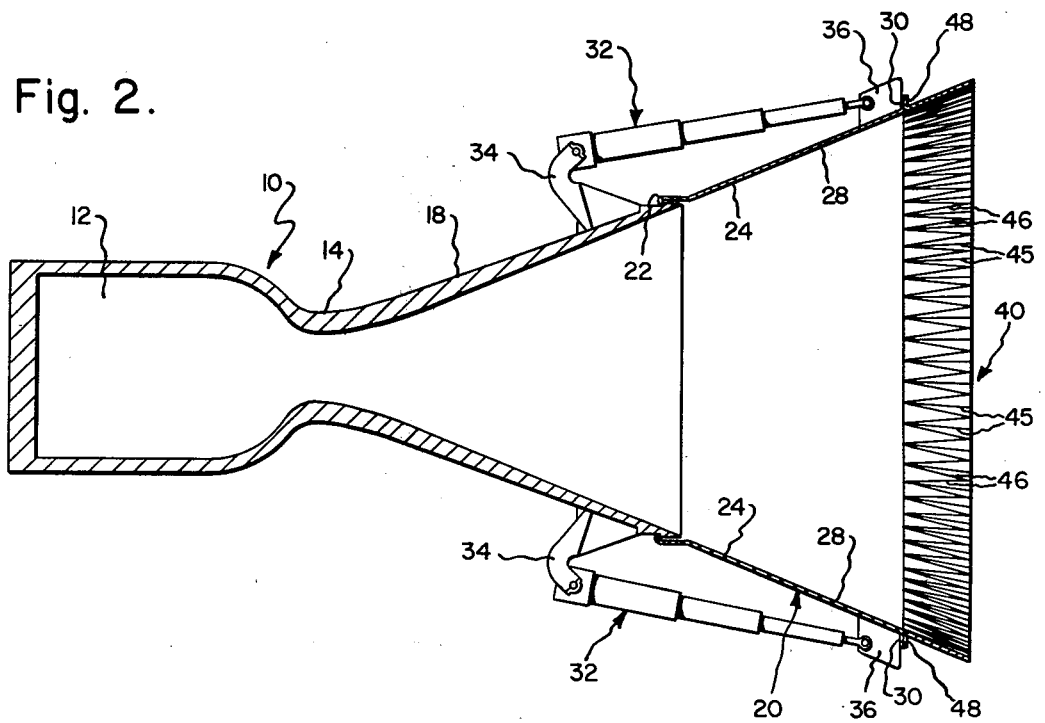
FIG. 2 is a view corresponding to FIG. 1, but illustrates the engine nozzle and the auxiliary skirt device in their extended/expanded operative position.
Figure 3:
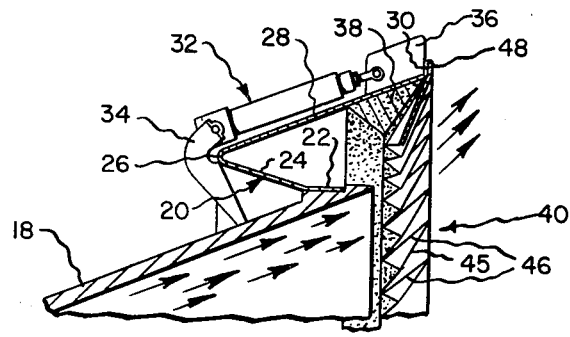
FIG. 3 is a fragmentary view corresponding to a portion of FIG. 1, and illustrates the flow stream lines of the engine exhaust plume prior to operation of the extendible nozzle actuators and prior to engagement of the plume with the previously stowed skirt.
Figure 4:
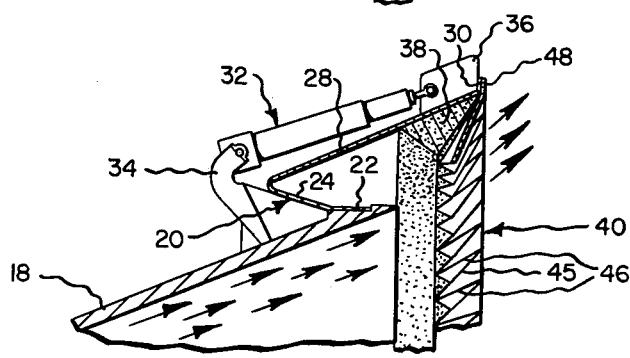
FIGS. 4, 5, 6, 7, are views corresponding to FIG. 3, but illustrates in sequence the progressive stages of deployment of the skirt and the extendible nozzle devices; as will be explained more fully hereinafter.
Figure 5:
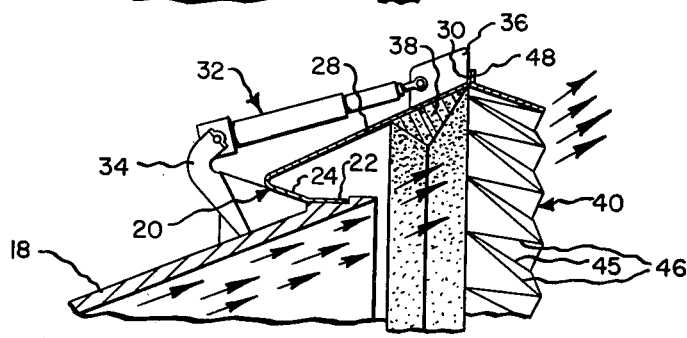
Figure 6:
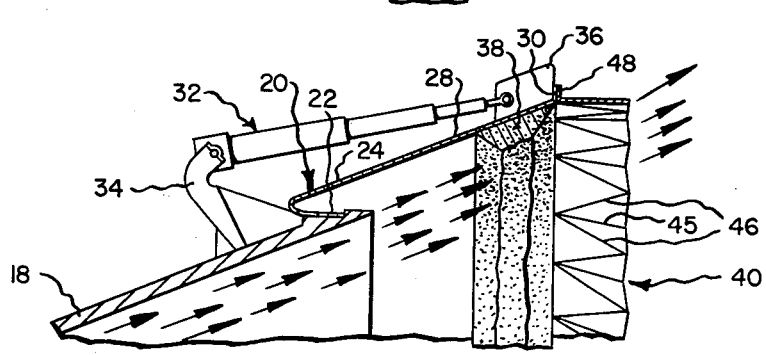
Figure 7:
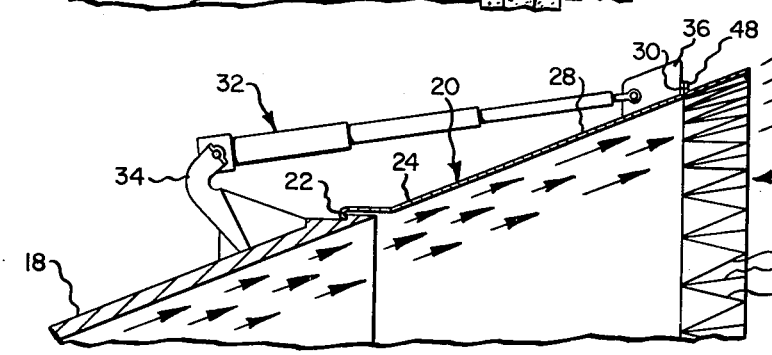

As illustrated at FIGS. 1–7 herewith, the extendible nozzle section 24/28 may be arranged to be deployed from its retracted or "stowed" position (as shown in FIGS. 1, 3) to its extended position (as shown in FIGS. 2, 7) by means of actuators 32 such as are disclosed for example in U.S. Pat. 3,346,186. Such actuators 32 may be disposed at intervals about the nozzle 18, and fulcrumbed thereon such as by means of brackets 34. As shown, at their extendible ends the actuators pivotally attach to a ring-like member 36 which is fixed by any suitable means to the flange 30 of the extendible nozzle section 20.

As explained for example in U.S. Pat. No. 3,784,109, the extendible nozzle section 20 may be fabricated of thin sheet lightweight heat-resistant material such as "columbium C-103"; and is adapted to be convolute-folded back upon itself to assume the retracted condition thereof as shown in FIGS. 1, 3, of the drawing herewith. Thus, the section is thereby nested relative to the fixed nozzle structure so as to reduce the space required to house the assembly when inoperative. Upon operation of the actuators 32, as the latter extend they cause the convoluted member 20 to unroll outwardly until it is finally extended in a position such as shown in FIGS. 2, 7, whereby the deployed nozzle section provides a smooth slope continuation of the fixed nozzle section 18.

As explained in U.S. Pat. No. 3,784,109, the frusto-conical nozzle extension 20 may be constructed by shear spinning it from a suitable circular blank of sheet metal. The extension may then be telescopically rolled back upon itself to provide an inner convolution surrounded by an outwardly spaced but somewhat parallel outer convolution joined by the fold section 26. Alternatively, the convolutions may be formed separately and joined together as a unitary whole in the collapsed condition as illustrated by FIG. 1 by means of welding or the like. As illustrated at 38, a positional stabilizing and deployment control device may be optionally provided in the form of a lightweight ring of filler material, such as aluminum honeycomb or the like, in nested position between adjacent portions of the retracted nozzle portion 28 and the stowed skirt 40. Preferably, this device is adapted to be heat-eroded away upon engine firing, or is segmented and may be spring-loaded for jettisoning ejection after release by opening of the skirt device 40.

In accordance with the present invention the payload/range performance capability of an engine of this type may be substantially improved by the addition of a deployable skirt such as is indicated generally by the numeral 40. The device 40 comprises, when extended, a frusto-conical shaped thin sheet metal sleeve, but which when first installed prior to engine firing is in the configuration as shown in FIGS. 1, 3, for compact stowage thereof. Fabrication of the device may be effected by processing a thin sheet metal workpiece 42 as illustrated by way of example at FIGS. 14–17 herewith.

As shown therein, an arcuately shaped strip 42 of thin sheet metal (of metallurgical specifications as referred to hereinafter) is pressed between upper and lower die devices 43, 44, respectively, which are complementarily configured, so that the dies deform the workpiece to include creases extending transversely of the workpiece in the form of upwardly extended ridges 45 in-between which are disposed downwardly depressed valley portions 46. Note that the upraised ridge portions 45 extend normal to the longitudinal edges of the workpiece; whereas the downwardly projected valley portions 46 are paired in converging configurations as best shown at FIG. 14. Incidental to this die-forming operation the die members are also equipped to sever the work sheet along lines 47 adjacent the edge of the work sheet where the lines 45–46 converge; the creases 45-46 terminating at the inner ends of the cuts 47. Alternatively, the dies may be arranged to press the creases 45 downwardly, and the creases 46 upwardly.

Thus, when the work sheet exits from the die-forming/cutting operation, it will appear in a form as depicted at FIG. 16. The work sheet is then pleat-folded upon itself progressively from one end thereof to the other as shown at FIG. 17; such as by retention of one end of the work sheet in a suitable fixture while progressively press-feeding the body of the work sheet towards and against the progressively restrained portions thereof. The cuts 47 facilitate this pleat-folding operation while at the same time providing attachment platelets 48. This pleat-folding operation brings the opposite ends of the work sheet into abutting relation, whereupon they are butt-welded or otherwise fixed together; thereby fabricating the skirt into a flat annular form as shown for example at FIG. 9. Incidental to the pleat-folding operation the previously formed cuts 47 enable the segmented portions thereof to spread slightly apart, thereby providing the "fan" of platelets 48 which are adapted to be affixed to the rim portion 30 of the rocket engine by any suitable means such as welding, riveting, or the like. Thus, it will be appreciated that the skirt device as initially pleat-folded will assume a "stowed" position interiorly of the engine nozzle sections 28, 50 and 56, respectively, when attached thereto as shown for example at FIGS. 1, 3, 8, 12; whereat the skirt device adds little or nothing to the packaging space requirement for the overall engine/nozzle unit prior to firing of the engine.

FIGS. 4, 5, 6, 7, illustrate progressively deployment of the engine nozzle/skirt combination incident to firing of the engine 10. Following ignition of the engine the actuators 32 thereof are operated so as to extend the nozzle 20 as illustrated progressively at FIGS. 3–7, as explained for example in U.S. Pat Nos. 3,711,027 and 3,784,109. Incidental to this the filler ring 38 is either jettisoned or heat-eroded away (FIG. 6) and the skirt 40 is peripherally engaged by the engine exhaust plume and thereby driven outwardly to assume throughout the inner surface thereof a smoothly continuing extension of the conical slope form of the engine nozzle, as shown at FIGS. 2, 7.

FIGS. 8, 9, compositely illustrate adaptation of the skirt 40 of the invention to a fixed nozzle type rocket engine wherein the nozzle 50 is of simple frusto-conical form and occupies the same space before and after firing of the engine. The skirt 40 is in this case attached to the exhaust end of the nozzle 50 as indicated at 52 and is deployed from the stowed position thereof as shown in FIGS. 8, 9, to the expanded/extended position thereof as shown in FIGS. 10, 11, in response to pressure develconverging pair being separated from the next pair by a single outwardly directed crease;

c. progressively pleat-folding the workpiece from one end thereof to the other, and then;

d. fastening the opposite ends thereof together to form the device into a generally flat annular configuration;

whereby the device is adapted to be attached along its outer periphery to the exit end of an engine nozzle with the body of the device in a stowed position relative thereto occupying no substantial space outside of the engine nozzle;

whereby upon engine firing, the device may deploy to provide an effective engine nozzle/skirt